(No Model.)  10 Sheets—Sheet 2.

C. I. EARLL.
CABLE RAILWAY.

No. 511,596.  Patented Dec. 26, 1893.

WITNESSES:
John L. Edwards Jr.
Fred. J. Dole.

INVENTOR
Charles I. Earll.
BY F. W. Richards
ATTORNEY (No Model.)
C. I. EARLL.
CABLE RAILWAY.
No. 511,596.
10 Sheets—Sheet 3.
Patented Dec. 26, 1893.
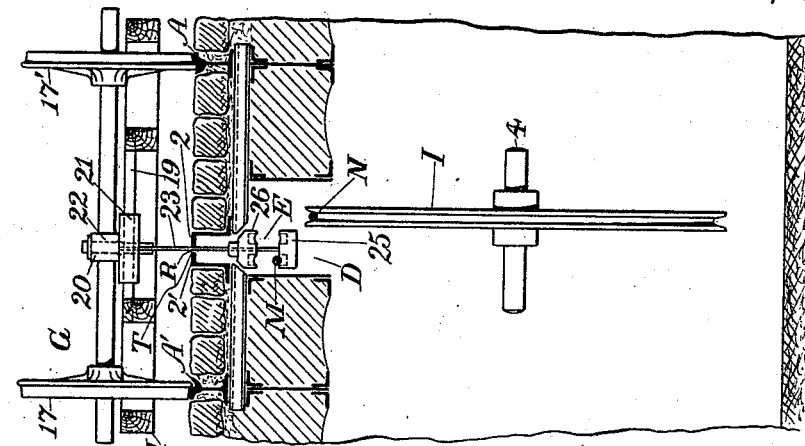
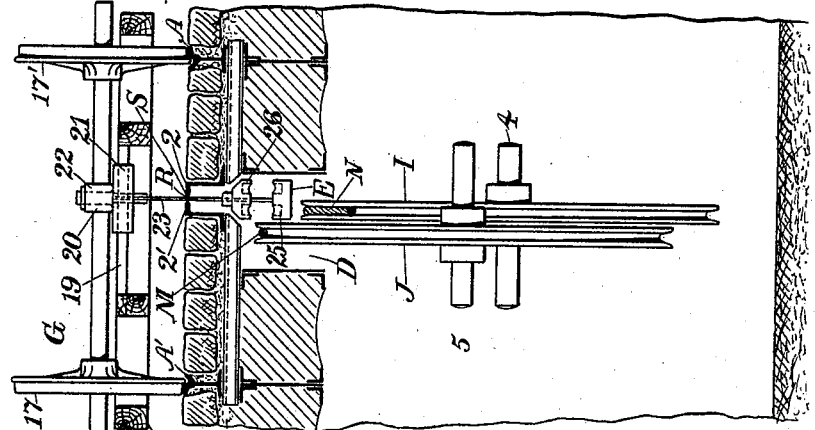
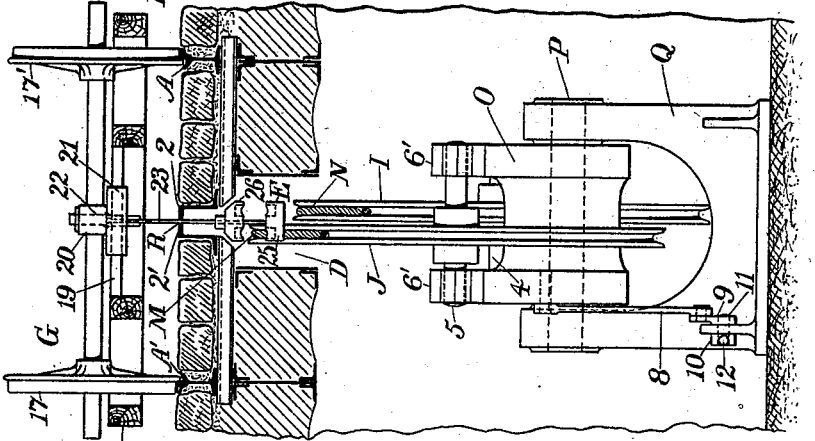
WITNESSES:
John L. Edwards Jr.
Fred. J. Dole.
INVENTOR
Charles I. Earll.
BY F. A. Richards
ATTORNEY

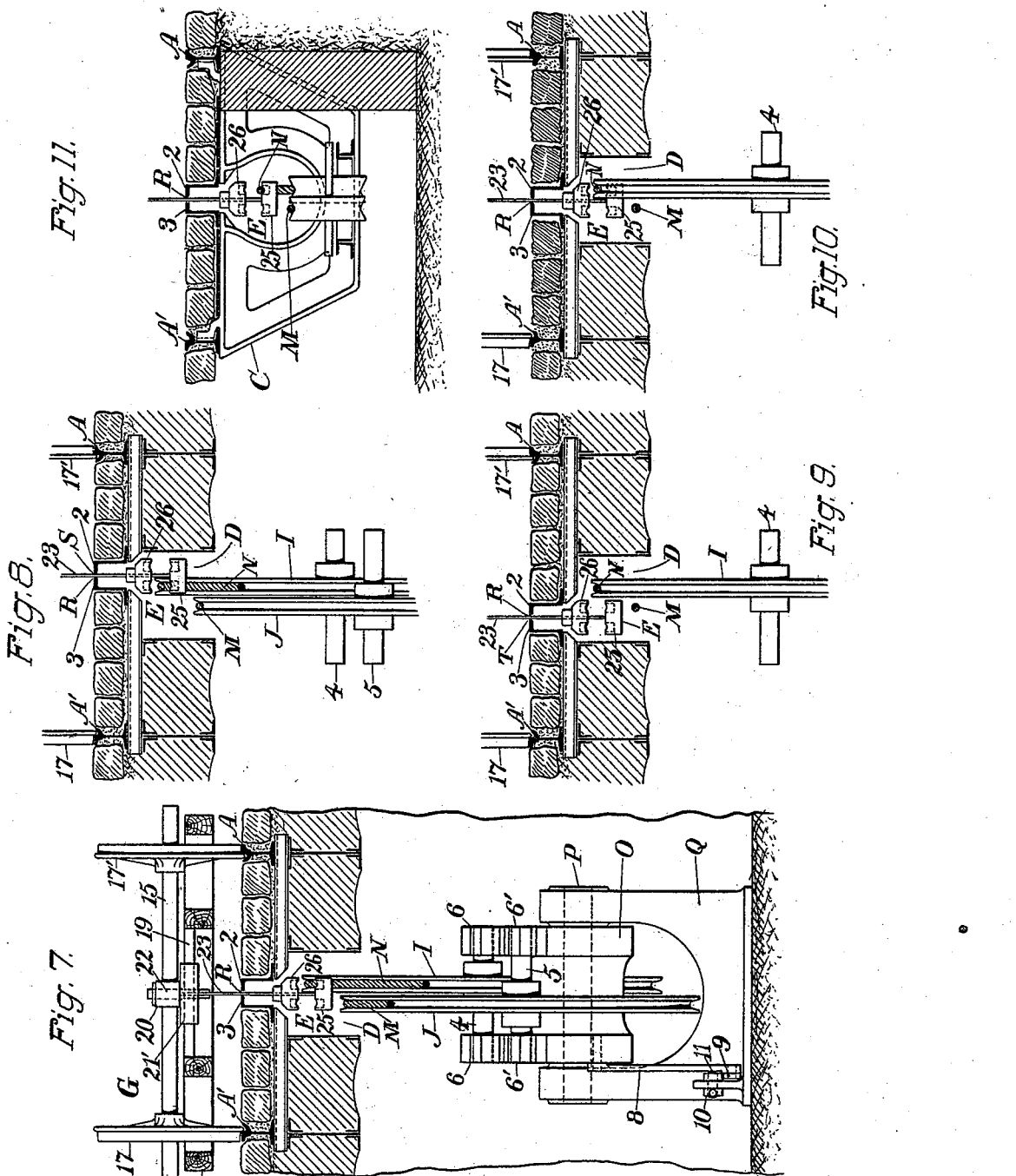

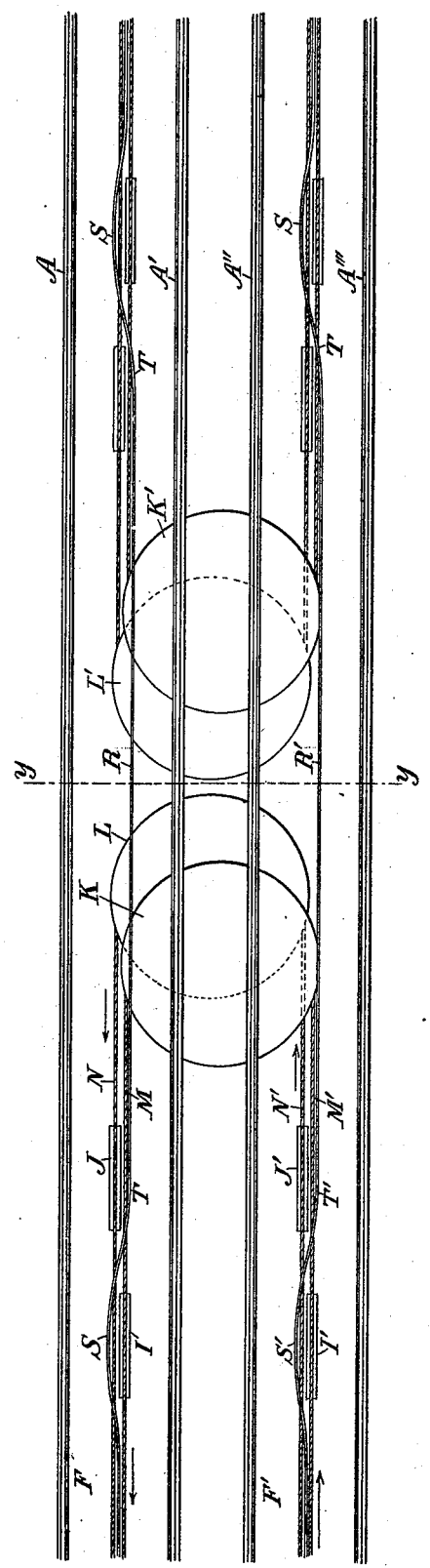

(No Model.) 10 Sheets—Sheet 6.
C. I. EARLL.
CABLE RAILWAY.
No. 511,596. Patented Dec. 26, 1893.
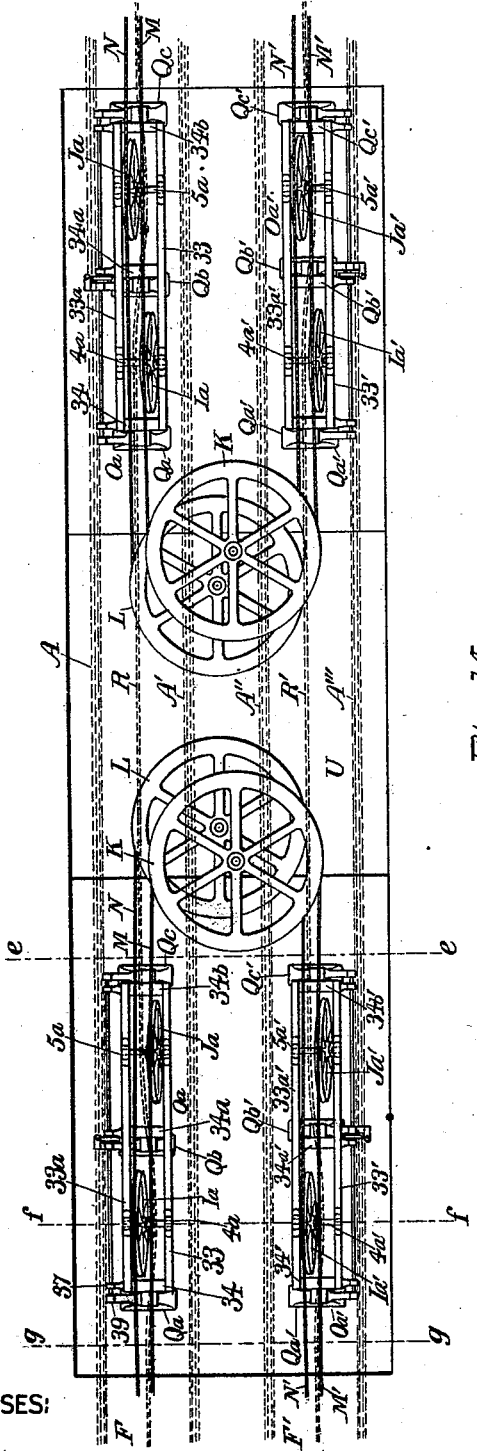
WITNESSES:
John L. Edwards Jr.
Fred. J. Dole.
INVENTOR
Charles I. Earll.
BY J. H. Richards
ATTORNEY (No Model.) 10 Sheets—Sheet 7.
C. I. EARLL.
CABLE RAILWAY.

No. 511,596. Patented Dec. 26, 1893.

WITNESSES:
John L. Edwards, Jr.
Fred. J. Dole

INVENTOR
Charles I. Earll,
BY F. H. Richards
ATTORNEY (No Model.) 10 Sheets—Sheet 9.

C. I. EARLL.
CABLE RAILWAY.

No. 511,596. Patented Dec. 26, 1893.

WITNESSES:
John L. Edwards Jr.
Fred. J. Dole.

INVENTOR
Charles I. Earll.
BY F. H. Richards
ATTORNEY (No Model.) 10 Sheets—Sheet 10.

C. I. EARLL.
CABLE RAILWAY.

No. 511,596. Patented Dec. 26, 1893.

WITNESSES:
John L. Edwards Jr.
Fred. J. Dole.

INVENTOR
Charles I. Earll.
BY J. H. Richards
ATTORNEY

UNITED STATES PATENT OFFICE.

CHARLES I. EARLL, OF NEW YORK, N. Y.

CABLE RAILWAY.

SPECIFICATION forming part of Letters Patent No. 511,596, dated December 26, 1893.

Application filed April 11, 1893. Serial No. 469,894. (No model.)

*To all whom it may concern:*

Be it known that I, CHARLES I. EARLL, a citizen of the United States, residing at New York, in the county of New York and State of New York, have invented certain new and useful Improvements in Cable Railways, of which the following is a specification.

This invention relates to cable railways, the object being to provide an improved and effective mechanism or apparatus for use in connection with a pair of driving cables whereby the two cables may be shifted, one into position for use and the other into position for non-use, and whereby the cable being used may be placed in and removed from the grip of a cable car.

Figure 1:
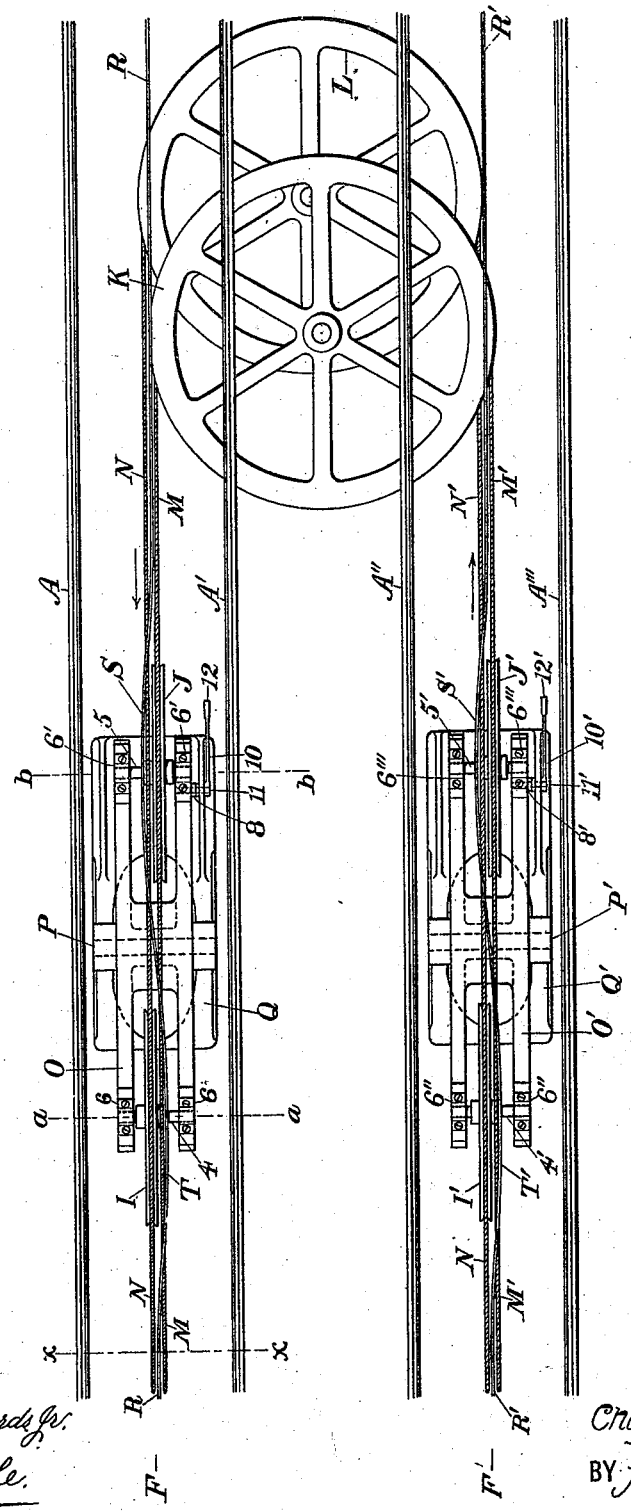
Figure 2:
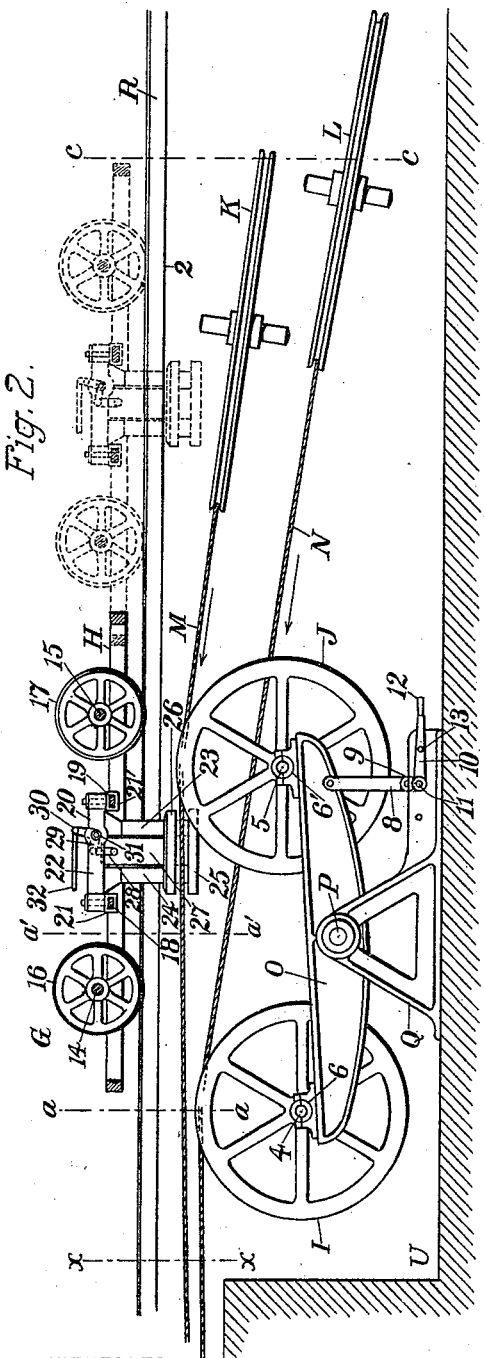
Figure 3:
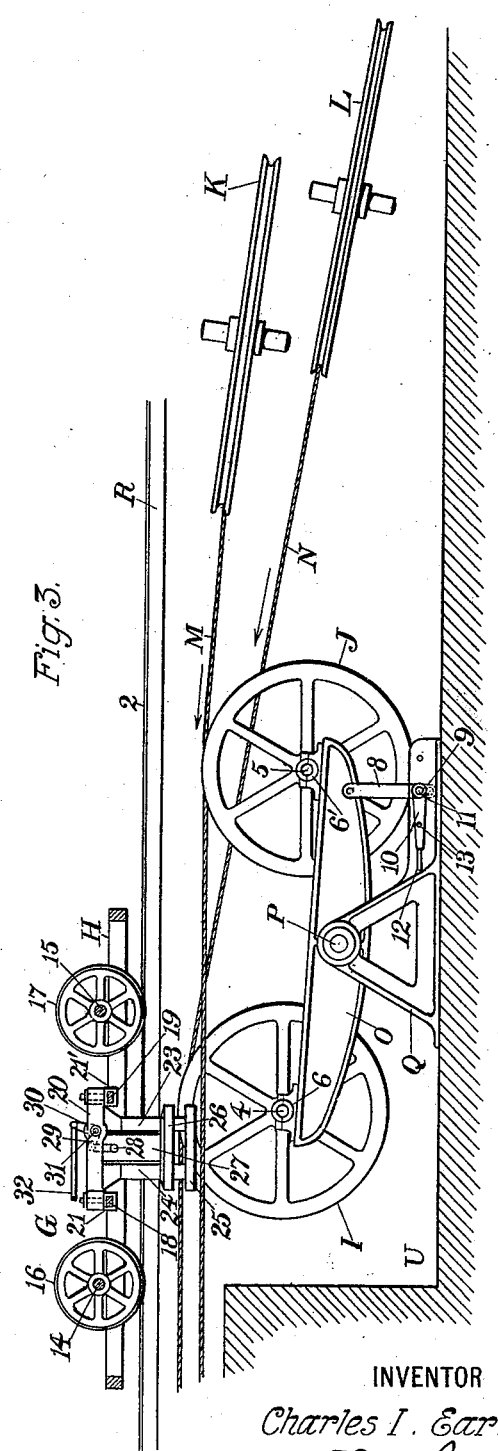
Figure 15:
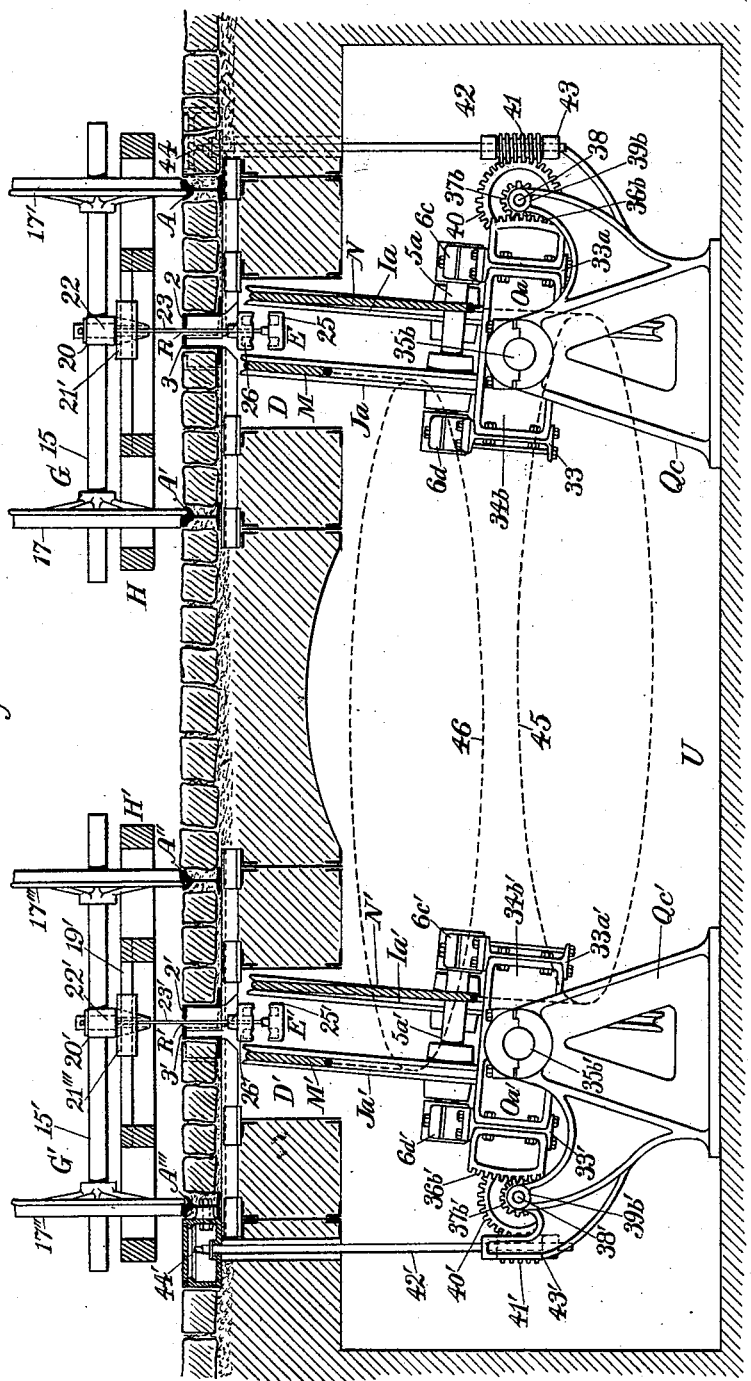
Figure 16:
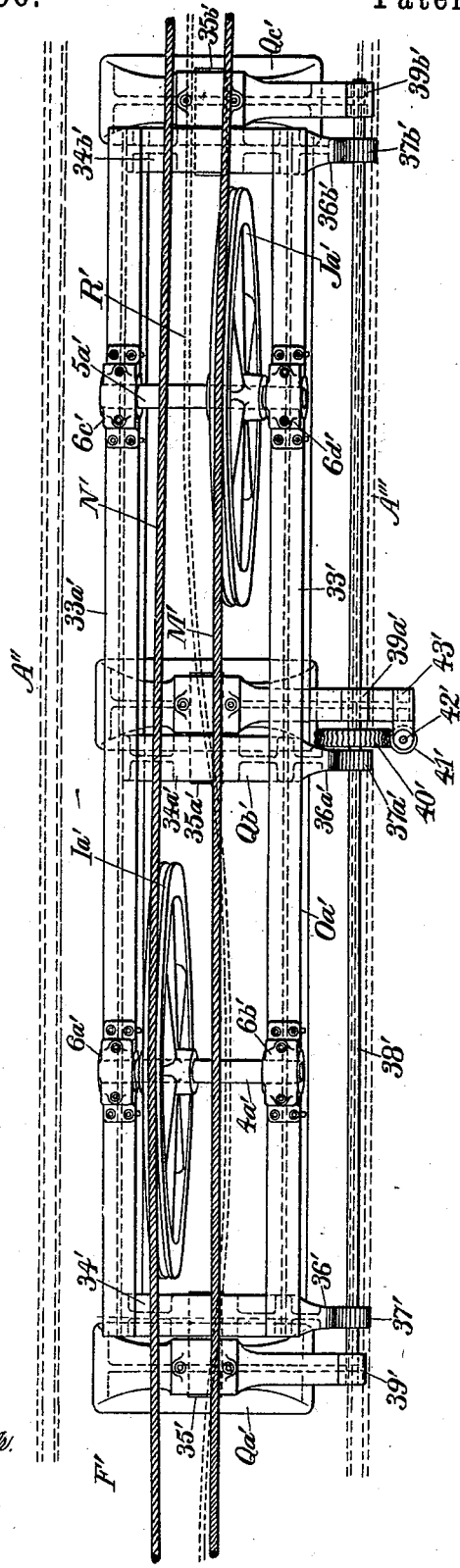
Figure 17:
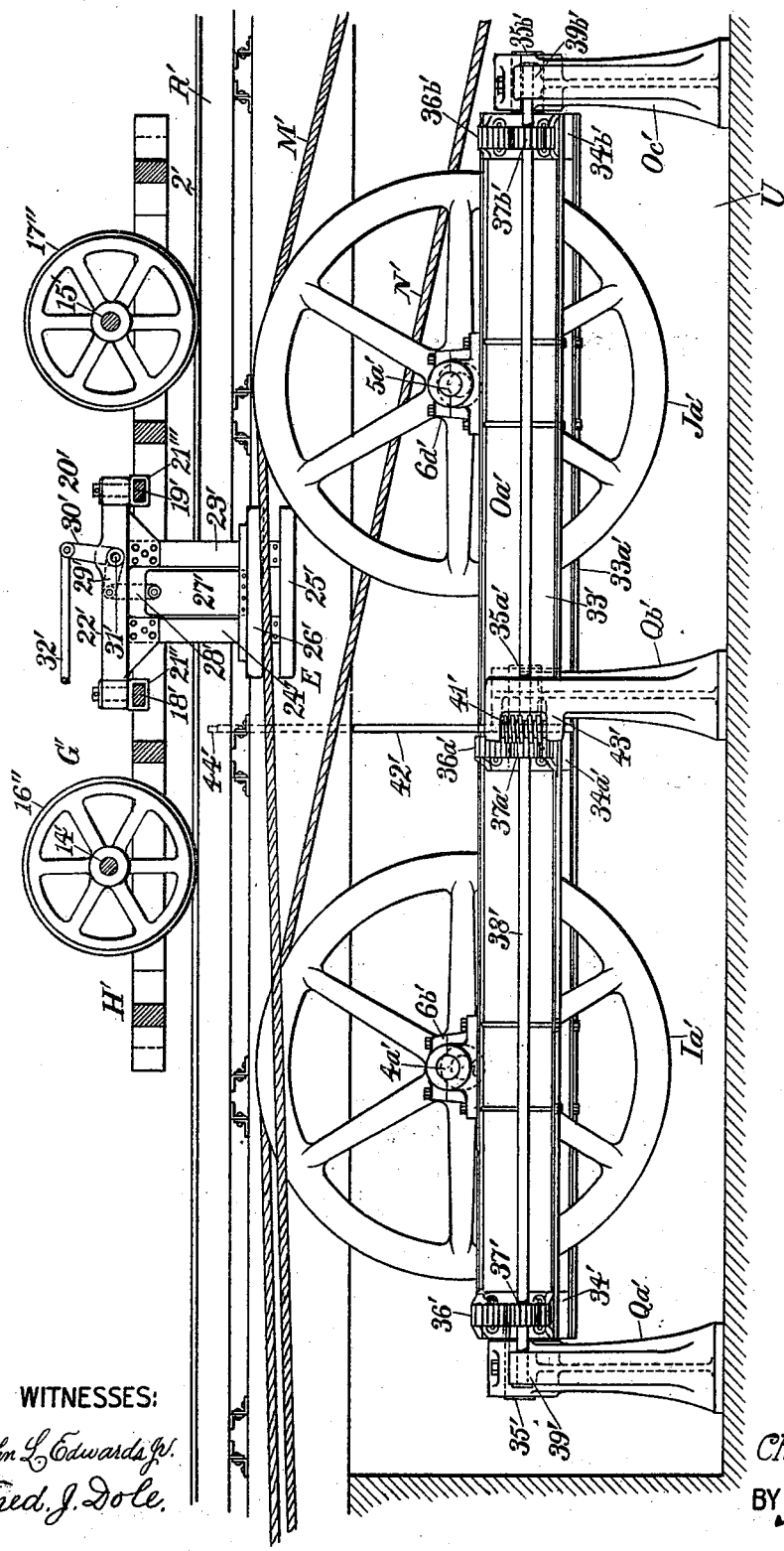
Figure 20:
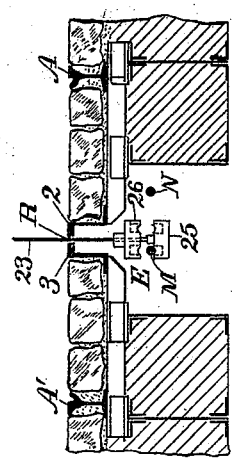
Figure 19:
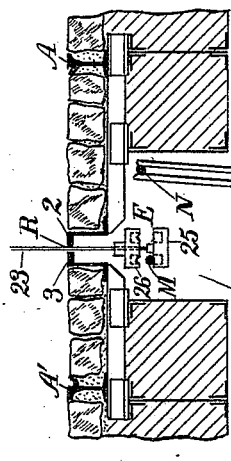
Figure 18:
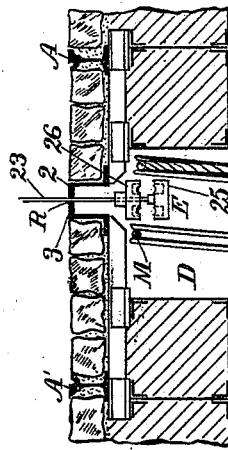
Figure 23:
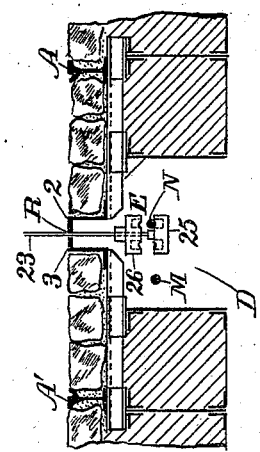
Figure 22:
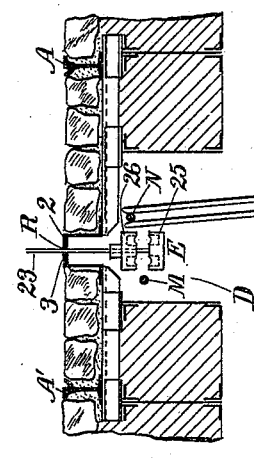
Figure 21:
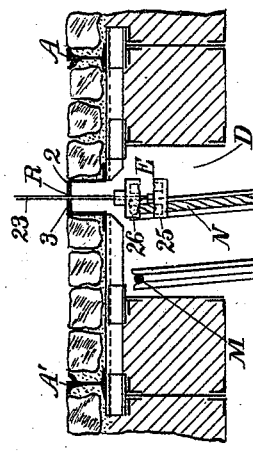

In the drawings accompanying and forming a part of this specification,—Figure 1 is a plan view of a portion of a double track cable-road furnished with one form of my present improvements for placing the "live" cable in, and removing it from, the grip of the cable car. Fig. 2 is a side elevation, as seen from below in Fig. 1, of the cable road track which is designated in a general way by F, this being the track on which the cars move toward the left hand; in this figure the cable car designated in a general way by G is shown in place on track with its grip jaws opened ready to receive the "live" cable M. Fig. 3 is a view similar to Fig. 2 of the same track and mechanism showing the cable M lowered, or "dead" and the other cable N, raised into position for use, or "live;" also showing the cable car with its grip jaws open ready to receive the "live" cable N. Fig. 4 is a vertical transverse section in the line of $c\,c$, Fig. 2, the intermediate sheaves being removed with the cable car G in the position shown by dotted lines in said Fig. 2. Fig. 5 is a vertical transverse section of track structure at about the line $b\,b$, Fig. 1, the cable car being in the position shown in full lines in Fig. 2, and having the jaws of its grip open ready to receive the cable. Fig. 6 is a view similar to Fig. 5 at about the line $a\,a$, Fig. 1, showing cable car in position at the left hand of the sheave J, and about opposite to the sheave I. Figs. 7, 8, 9 and 10, are sectional views corresponding to Figs. 4, 5 and 6, taken in the successive positions indicated by lines $c\,c$, $b\,b$, $a\,a$ and $x\,x$, respectively, Figs. 1 and 2, the intermediate sheave being omitted in Fig. 7. Fig. 11 is a sectional view of the track structure illustrating the manner of running and using the cables at a point on the line of the road at a distance from the pit. Fig. 12 is a diagrammatic view illustrating the arrangement according to my present invention of the several terminal sheaves, elevating sheaves and grip-slot curves at an intermediate pit on the double-track cable-road; that portion of Fig. 12 which is at the left hand of line $y\,y$, corresponds to the portion of the cable road shown in Figs. 1, 2, and 3. Fig. 13 is a plan view of a portion of the double track cable road and the mechanism at an intermediate pit provided with my present improvements, constructed and arranged in a modified form; in this figure, the track-structure is only indicated by the track rails, and the grip-slots both of which are being shown by dotted lines. Fig. 14 is a side elevation of the mechanism shown in Fig. 13, and is drawn in projection therewith. Fig. 15 is an enlarged cross-sectional view in line $e\,e$, Fig. 13, showing the complete double-track cable-road furnished with this modified form of my present improvements. Fig. 16 is an enlarged plan view of one of the cable-shifting mechanisms shown in Figs. 13, 14 and 15. Fig. 17 is a side elevation of the modified cable-shifting mechanism shown in end view and plan respectively in Figs. 15 and 16, and showing also a cable car with its grip in position to receive the "live" cable. Fig. 18 is a sectional view of the track F, taken in line $e\,e$, of Fig. 13, showing the grip carried inwardly ready for passing the sheave $J^a$, before being carried into position for receiving the cable M. Fig. 19 is a sectional view similar to Fig. 18, and taken in line $f\,f$, showing the grip carried toward the inner rail of the track and passing the outwardly shifted sheave $I^a$, which is here shown carrying the "dead" cable N; the grip itself is shown carrying the "live" cable M. Fig. 20 is a similar sectional view in the line $g\,g$, Fig. 13 showing the grip in that portion of the grip-slot which is central between the track rails; the "live" cable is shown between the jaws on the left-hand side, while the "dead" cable is shown at some distance away from the grip at the right-hand thereof. Figs. 21, 22 and 23, are sectional views corresponding to Figs. 18, 19 and 20, respectively, and similarly illustrate the operation of the parts in connection with the other cable N, which is here shown shifted into position for use.

Similar characters designate like parts in all the figures.

For clearness of illustration of the more essential features of the improvements, the track structure, with the exception of the track rails and the grip-slot is omitted from the Figs. 1, 2, 3, 13, 14 and 17, and in some other views it is only partially shown.

This invention provides a method and means whereby one or the other of the two cables, in a system of cable traction where two cables are used in the same conduit, can be placed in the cable-car grip or removed therefrom automatically; the only operation required of the grip is that it shall be opened just previous to its passing the points where the cable is to be taken into or ejected from it. The grip may be of any approved form of "side" grip; i. e. a grip which takes the cable in at the side, and preferably one that is attached to the car in such a way that it may have a lateral motion with reference to the car.

The system of cable traction in which two cables are used in the same conduit, and which is the one to which this invention relates, will be referred to as the duplex system. In the duplex system, the cables are, in general, carried at a short distance apart and at the same level. One cable only is used by a grip at a time, the purpose of having the two cables being that in case of disablement of one, delay is avoided by having another ready for use. The cable which is being used will be referred to as the "live" cable. The other, which in general is kept at rest, will be referred to as the "dead" cable. The cable which when facing in the direction in which the cable moves is carried on the right-hand side of the grip, will be referred to as the right-hand cable, and that on the opposite side as the left-hand cable.

The track-structure shown in connection with my present improvements comprise the usual track rails A, and A', which extend along the line of the road and except at the several pits, are supported upon the usual yokes C. Shown in Fig. 11. Midway of the width of the track it has the usual grip-slot R, which, except as elsewhere herein described, is parallel with the track rails. The track structure also has the usual conduit D wherein the two cables M and N are supported along the line of the road by the ordinary supporting sheaves, as I and J, placed and operated in the usual manner. Over the power station pit and over any intermediate pit or terminal pits the track is supported by bridge work, usually comprising plate girders and masonry arches forming the roof of the pits, in the well known manner illustrated in a general way in the several cross-sectional views. The grip-slot R of the track is formed between the two slot-rails 2 and 3, which at the cable-shifting apparatus are curved laterally of the track to form the curved portions as T and S, and T' and S', of the grip-slots R and R' respectively. By means of these slot-curves in connection with the cable-shifting apparatus hereinafter described and with the rails of the cable road, the grip of the cable car is, at the proper time, carried sidewise of the car and of the cable-road track a sufficient distance to carry said grip beyond the vertical plane of the cable and thus remove the cable from the grip.

For illustrating the construction and mode of operation of the novel features of my cable railway improvements, I have shown in some of the figures of drawings so much of the ordinary cable-car as seems essential to a proper understanding of my present invention, and the manner of using the same. Such car may consist, as herein shown, of a suitable horizontal frame designated in a general way by H, which frame is carried by a pair of axles 14 and 15 furnished respectively with the usual car-wheels 16 and 16' 17 and 17', adapted for running on the track rails.

The car-frame H is shown provided with the transverse parallel guide-bars 18 and 19, upon which guides the grip-frame 20 is mounted and slides laterally of the car-frame. Said grip-frame may properly consist of the guide bearings 21 and 21', and the yoke 22 supported at the ends thereof on the ends of said sliding bearings 21 and 21', and carrying the downwardly projecting shanks 23 and 24 for supporting the lower jaw 25 of the grip. The upper jaw 26 is carried on the said shanks 23 and 24, being perforated therefor, and having between the said shanks a central shank 27 whereby said upper jaw is operated through suitable connections (not all herein shown) with the grip-lever of the car. These connections as herein shown comprise the link 28 connected at its lower end to the middle shank 27, and at its upper end to the frame 29 of an angle-lever, 30, which is pivotally supported at 31, on the yoke 22, and whose upper end connects with a rod, 32, that is supposed to extend to the usual grip-operating mechanism on the platform of the car. By actuating said angle lever 30, this will, through the connections described, operate the middle shank 27 and thereby raise or lower the upper jaw 26 of the grip to release or seize the "live" cable, as may be required. In the several views in which the cable grip (or the lower portion thereof) is shown, the grip-jaws 25 and 26 are shown open, but the operation of this class of cable-grips being well-known, it is not deemed necessary to show the grip-jaws in their closed position. The operation of this laterally movable cable-grip in passing through the curved portions of the grip-slot of the track is substantially the same as the operation of similar kinds of grips in passing through the curved grip-slots heretofore used in cable roads operated by a single cable, for carrying a cable-grip past a fixed sheave.

As hereinbefore described the grip shown in the drawings is opened and closed by a vertical movement of one of the jaws thereof, this being as herein shown the upper jaw of the grip, but obviously that kind of grip in which the lower jaw instead of the upper one is arranged to move vertically might be used in place of the one herein shown. The grip-jaws are opened and closed by the movement of one of those jaws, by a movement crosswise (vertically) of the plane (which is the plane of the surface of the road) of the curved portion of the grip-slot of the track.

In connection with a track structure having its track slot made with laterally deflected or curved portions, as described, and in combination, also, with two independently operable driving cables in the conduit, I provide a cable-shifting apparatus having a cable-carrying sheave, or cable-elevator, for each of the cables, respectively, which sheaves are shiftable in a direction crosswise to the grip-slot of the track and shift the cables, one into position for use, and the other into position for non-use, and vice versa, as may be required. For the purpose of effecting the movement of said cable carrying sheaves, these sheaves are shown mounted upon a suitable tilting frame, the construction and arrangement of which may be modified to suit the circumstances of any particular case. In the present instance, I have shown two modes of arranging the shiftable sheave-carrying apparatus. According to the plan or arrangement shown in Figs. 1 to 12, inclusive, two sheaves I and J, are mounted on the opposite ends of a tilting frame O, which is pivotally supported about midway of the length thereof upon a shaft or pivot, P, that is carried upon a base-frame Q, set upon a suitable foundation after the ordinary manner of setting cable-road machinery. Sheaves I and J are shown carried by the shafts 4 and 5 respectively, which are journaled in suitable bearings, as 6 and 6', fixed on the arms of the frame O.

As a means of shifting the frame O from its position shown in Fig. 2 to its position shown in Fig. 3, and vice versa, any well known form of frame-shifting apparatus may be employed. One suitable device for this purpose consists of the link 8 connected at its upper end to said frame and at its lower end to the crank arm 9 of a lever 10, that is shown journaled at 11 in the frame Q, and has a handle, 12, whereby it may be operated; and an ordinary locking-pin, 13, whereby it may be held in position. These several minor details being old and well known, the same are only briefly illustrated in the drawings.

When it is required to reverse the positions of the two cables, as for instance so that cable M will be shifted from its working position shown in Fig. 2, to its non-working position shown in Fig. 3, it is only necessary to unlock the lever 10, and throw the same over to its opposite position, thereby tilting the frame O to lower the sheave J and elevate the sheave I, thereby shifting the cables so that the cable M from being a "live" cable becomes a "dead" cable and the cable N from being a "dead" cable becomes a "live" cable.

In the modification illustrated in Figs. 13 to 23, inclusive, the cable carrying sheaves $I^a$ and $J^a$ (corresponding to sheaves I and J respectively), instead of being shifted vertically only, are shifted as in the previous case in a direction crosswise to the grip-slot, but in this instance in a direction also lateral of the track. But in each case, it will be noted, the manner of shifting the two cables, one into position for use and the other into position for non-use, and vice versa, is substantially the same within, and for the purposes of, my present invention. In this modification of the sheave-shifting apparatus, the sheaves $I^a$ and $J^a$ are shown supported at successive points longitudinal of the sidewise-tilting frame $O^a$; which frame is composed, in the preferred form thereof herein shown, of two side-bars or beams 33 and $33^a$ connected at suitable points by the cross-bars 34, $34^a$ and $34^b$. Said cross-bars are shown provided with journals 35, $35^a$ and $35^b$ which are supported in the three frames or pillow blocks $Q^a$, $Q^b$ and $Q^c$, these being fixed on the usual foundations. See Fig. 16.

As in the form of sheave-shifting apparatus hereinbefore described in connection with Figs. 1 to 12, the sheaves $I^a$ and $J^a$ are carried upon the shafts $4^a$ and $5^a$, respectively, which are journaled in the bearings $6^a$, $6^b$, $6^c$ and $6^d$, fixed on the sides of the tilting frame. As a means of tilting or shifting said sheave-carrying frame, this frame is shown provided with the tooth segments 36', $36^{a\prime}$ and $36^{b\prime}$, fixed on one side thereof, and meshing with the respective pinions, 37', $37^{a\prime}$ and $37^{b\prime}$, which are fixed on a shaft 38', that is supported in the bearings 39', $39^{a\prime}$ and $39^{b\prime}$, of the aforesaid pillow blocks $Q^{a\prime}$, $Q^{b\prime}$ and $Q^{c\prime}$. Said shaft 38', is, or may be actuated by means of the worm-wheel 40', fixed thereon, and the worm 41' meshing with the said worm-wheel and carried by the worm-shaft 42'; this shaft is journaled at its lower end, in the outer end of the frame arm 43', and may have at its upper end the usual square nut or head 44' for receiving a wrench or crank for operating the same. In practice the said worm-shaft 42' extends upward to the street surface and may terminate in a box or casing provided with a cover for protecting the same when not in use. By means of a wrench applied to said worm-shaft the operator through said shaft and the gearing described is enabled to tilt or shift the sheave-carrying frame $O^{a\prime}$ from the position thereof shown in Figs. 15, 16, 18, 19, 21 and 22, inclusive, to the position indicated (by the position of the sheaves) in Figs. 18 and 19, and vice versa.

The manner of setting the sheave-shifting frame, in order to shift one sheave into position for use and the other sheave into position for non-use of the cable carried thereby, determines which of the cables should be taken up by the cable cars passing that point on the cable road. At the end of the portion of the cable road which is operated by one pair of cables these are passed from one track to the opposite track over ordinary intermediate sheaves, as K and L, which are or may be supported by the usual U-frames fixed upon suitable foundations in the intermediate pit U, Figs. 2, 3, 13, 14, 15 and 17. Said sheaves K and L are shown set some distance lower than the upper sides of the shiftable sheaves I° and Jª, this being done primarily for the purpose of deflecting that portion of the cables intermediate to said sheaves K and L, away from the path of the grips of the cable cars as will be understood by comparison of Figs. 2, 3, 14 and 17.

In Fig. 15, the position of the sheaves K and L are indicated by dotted elliptical lines 45 and 46 respectively. The cable car, starting from the position shown by the dotted lines in Fig. 2, and traveling toward the left-hand, and the cable M being the "live" cable, as shown in said figure and in Figs. 4, 5 and 6, the grip E is first carried away from the cable M by the curved portion of the slot S, as indicated in Fig. 5, and Fig. 1, so as to pass the inner side of the sheave J; next the grip is carried in the opposite direction by the inward curvature of the portion S of the slot R, until the grip reaches about the position of the line $a'\ a'$, Fig. 2, at which time the jaws of the grip pass over and receive the cable; and on the further movement of the car along the track, the oppositely curved portion T of the slot R carries the grip still farther in the direction of the cable M, (primarily for the purpose of providing for the passage of the grip by the inner side of the other sheave I,) when this is raised (as in Fig. 7) thereby temporarily deflecting the cable sidewise by carrying this with the grip to the position indicated in Fig. 6 and corresponding to the lines $a\ a$, Figs. 1 and 2. On the further movement of the car along the track the curved portion T of the slot R brings the grip back to its normal running position central between the rails as shown in Fig. 4; after passing the point indicated by the line $a'\ a'$, if the car is to be continued running, the gripman closes the grip-jaws 25 and 26 onto the cable; but if the car is to be stopped, the grip-jaws are, of course, allowed to remain open.

On the right side of the sheaves I and J, that is, on the side toward the terminal sheaves, or toward the power house pit or a cable-crossing pit, as the case may be, the cables are deflected downward, preferably at about the inclination shown in Figs. 2 and 3, so as to immediately carry the cables, and of course bring the terminal sheaves K and L, below the path of the grip of the cable car. By this means the grip, when this approaches the cables, (as indicated by dotted lines near the right hand of Fig. 2,) does not interfere with the "live" cable and is not interfered with by either of the cables or their driving or elevating sheaves.

The successive laterally curved portions T and S of the grip-slot are oppositely disposed, as illustrated in Fig. 1, for the purpose hereinbefore mentioned of carrying the grip first by one side of one of the sheaves, as J, and then by the opposite side of the other one of the sheaves, as I, which carry the two driving cables, N and M respectively. In practice, however, it is not necessary that the slots R and R' should be carried back, as in Fig. 1, to a central position between the track rails along that portion of the track between the elevating mechanisms of the two adjacent driving systems; but said portions of the grip-slots may be continued at one side of central line as shown in Fig. 12. While Fig. 12 corresponds as to the left hand portion thereof, as hereinbefore stated, to the portion of the cable road shown in Fig. 1, Fig. 12 also illustrates a modified arrangement of some of the principal features illustrated in Fig. 1, the curved portions T and S, and T' and S' being oppositely disposed and, in like manner, the sheaves I and J and I' and J' being reversed relative to the central lines of the tracks.

The mode of operation of the several details of the mechanism are not essentially modified by the arrangement illustrated in Fig. 12. The cable car running on the track F', Fig. 1, when approaching the elevating sheaves, the jaws of the grip having been opened before the car reaches said sheaves, the grip is first carried outward by the curved portion T' of the grip-slot R', and then carried inwardly (toward space between the two tracks) by the curved portion S' of the grip-slot. If during this time the run N' of the cable is the one in use, the grip will of course be carried free of the cable when passing the sheave I', this being elevated to the position of sheave I, in Fig. 3. If however, the other cable is the one in use, the passage of the grip along the curved portion T', of the grip-slot R', first deflects the cable slightly out of its normal position (in the same manner as, but in the opposite direction to, that illustrated in Fig. 6) and afterward on passing the curved portion S' of said grip-slot, carries the grip free of the cable in a manner corresponding to that in Fig. 5. The location of said lateral curves of the grip-slot longitudinally of the track and slot-rails, and relatively to the cable elevating sheave, is such; and also the height of the elevating sheave relative to the track itself and to the grip of the cable-car running on the track, that at the time the grip reaches the curved portion of the slot the cable will normally stand somewhat above the height of the grip. By this means, the jaws of the grip having been opened just previous to its arrival at the curved portion of the slot, the cable is raised free of the lower jaw of the grip, and this is carried sidewise free of the cable; the entire operation being accomplished smoothly and without shock and without any dragging of the cable on the jaws of the laterally moving grip.

By the terms "live" and "dead" as applied herein to the driving cables of the cable road I do not refer to the movement merely of the cable, but to the use and disuse of the same. The cable which is shifted or elevated into position for use is referred to as the "live" cable and, vice versa, the cable which is shifted or lowered out of position for use is referred to as the "dead" cable. It will however be understood that when one cable, as for instance M, is shifted from its live position (shown in Fig. 2) to its "dead" position (shown in Fig. 3) and the other cable N reversely shifted from its "dead" to its "live" position both cables must in practice be kept running until those cable cars which are being driven by the cable M shall have been all carried to the end of the portion of the track operated by that cable or to a point where the cable is diverted from the track. In practice it is also sometimes necessary to run the "dead" cable for the purpose of lubricating or inspecting the same.

The two sheaves I and J constitute separate cable-elevators, and are, as herein described, provided with means as described for alternately elevating and lowering the same. Said cable-elevators being located along the line of the track at the lateral deflections or curves in the grip-slot of the track, the cable-car grip, being laterally movable on the car, is carried past the cable-elevator by means of the deflected portion of the grip-slot, the track-rails continuing past the deflection in a straight line. When the first of the two cables is shifted crosswise of the grip-slot into position for use, the second cable is similarly shifted into position for non-use; and on the reverse movement of the cable-shifter (by which term I designate the cable-shifting sheaves and some suitable means for supporting and operating the same), of course the first cable is shifted into position for non-use and the second cable into position for use; that is, into the path of the cable-grip, or out of said path. The two cables being transferred, by means of the intermediate sheaves, from one track to the other, and those sheaves being located below the path of the cable-car grips, and the cable-shifters along each track, respectively, being independently operable, the same cable may be shifted into position for use or into position for non-use in either one of the tracks or in both of them, as may be required in any particular case.

The driving-cables are normally located in near proximity to each other, side by side in the conduit of the track-structure of the cable-road, and the successive oppositely-disposed curves or deflections of the grip-slot are extended sufficiently far laterally of the normal line of said slot, to carry the cable-car grip out of its normal path and out of engagement with the cable which is in position for use, and also far enough laterally of the track to freely pass the cable-elevating or shifting sheave, as I or J.

Either one of the two forms of cable-shifters herein shown and described may be used equally well at a power house pit or at the terminal pits of the railway; also at the crossings of cable-roads and in any place where on account of the cables leaving the conduit, it is necessary to place the line cable into the grip or remove it therefrom.

The modification of my present invention which is shown in Figs. 13 to 23 inclusive of the drawings of this application, and which is embraced in the broad claims herein, is reserved to constitute the subject-matter of a separate application, Serial No. 485,380, filed September 13, 1893, wherein said modification is further and specifically claimed.

Having thus described my invention, I claim—

1. In a cable railway, the combination with a track-structure having a grip-slot with successive, oppositely-disposed lateral curves, and with a cable-car and its grip, of a pair of driving cables located below the grip-slot, and a cable-shifter substantially as described in position at said curves for shifting the cables from and into the path of the grip.

2. In a cable-railway, the combination with a track-structure having a grip-slot in which are successive laterally disposed curves, and with a cable-car running on said track and having a grip provided with grip-jaws movable vertically to the plane of curvature of the grip-slot, of the driving-cable, and a cable-shifter comprising a sheave, shiftable with relation to the grip-slot, which sheave carries the cable and is located adjacent to the inner side of said grip-slot curve, whereby the grip is carried to one side of, and passes by said sheave when this is shifted to hold the cable in position for use.

3. In a cable railway, the combination with a track-structure having in the grip-slot thereof successive oppositely disposed lateral curves, of two driving-cables, and a cable-shifter having two sheaves, (one for the first cable and the other for the second cable) and in position adjacent to said curves, and adapted on one movement thereof to shift the first said cable at the first slot-curve into position for use and shift the opposite cable into position for non-use, and on the reverse movement thereof to shift the second said cable at the second slot-curve into position for use and shift the opposite cable into position for non-use.

4. In a cable railway, the combination with a track-structure having in the grip-slot thereof successive oppositely-disposed lateral curves, of two driving-cables, and a cable-shifter having a vertically tilting frame carrying two sheaves, one for each of the cables respectively, in position and operating to first elevate the one said cable at the first slot-curve and simultaneously lower the opposite cable, and then to elevate the other said cable at the second slot-curve and simultaneously lower the one said cable.

5. In a cable-railway, the combination with the track structure and its grip-slot and with a cable-car and its grip, of a plurality of independently operable driving-cables, and a cable-shifter located adjacent to and constructed to have a tilting movement in the plane of the grip-slot and carrying a plurality of sheaves, one in advance of the other and each supporting an independent cable, in position to be simultaneously shifted one into and the other out from the path of the grip, and vice versa, substantially as and for the purpose described.

6. In a cable-railway, the combination with the track structure and its grip-slot, and with a cable-car and its grip, of two independently operable driving-cables supported upon two independent sheaves journaled in bearings, one at each end of a pivoted frame, capable of and supported for being tilted in the plane of the grip-slot and adapted for raising and lowering the said sheaves with the cables supported thereon in opposition to each other, to bring one or the other of said cables in position to be engaged by the grip, and means for tilting said frame, substantially as described.

7. In a cable-grip, the combination with a track-structure having straight, parallel track-rails and having a laterally-deflected grip-slot, and with a cable-car running on the track-rails and having the open-side grip laterally movable on said car, of the two driving-cables, two cable-elevators, one for each cable, respectively, in position at the deflections of the grip-slots, and means for raising and lowering the cable-elevators, whereby either cable may be held in the path of the grip carried around the cable-elevator, substantially as described.

8. In a double-track cable-railway, the combination with the two track-structures each having a laterally-deflected grip-slot, of the two driving-cables, intermediate sheaves transferring the cables from one track to the other and located below the path of the cable-car grips, a pair of two-sheave cable-shifters, one located under each track, respectively, at said lateral curves of the grip-slots, and means for shifting said cable-shifters independently of each other from and into the path of the grips, whereby the same cable may be thrown into use or out of use in either one of the tracks, substantially as described.

9. In a cable-railway, the combination with a track-structure having a grip-slot with successive lateral deflections or curves, and with a cable-car and its grip, of a plurality of independently operable driving-cables, and a cable-shifter comprising a plurality of shiftable sheaves each of which support an independent cable and is located below the grip-slot in position to shift one or the other of said cables into and out from the path of the grip, substantially as described.

10. In a cable-railway, the combination with a track-structure having in the grip-slot thereof successively oppositely disposed lateral deflections or curves, and with a cable-car and its grip, of a plurality of independently-operable cables, and a cable-shifter comprising a plurality of sheaves shiftably-supported upon a tilting-frame, each of which sheaves support an independent cable and all of which are located below the grip-slot curves in position to shift the cables into and out of the path of the grip, substantially as described.

CHARLES I. EARLL.

Witnesses:
J. EMMET FLANAGAN,
W. ALEXIS MASON.